United States Patent [19]

Tonegawa

[11] Patent Number: 5,703,842
[45] Date of Patent: Dec. 30, 1997

[54] INFORMATION RECORDING/REPRODUCING APPARATUS FOR EXECUTING SYSTEM CONTROL AND SERVO CONTROL BY SINGLE CPU

[75] Inventor: Nobuyuki Tonegawa, Kawasaki, Japan

[73] Assignee: Canon Kabushiki Kaisha, Tokyo, Japan

[21] Appl. No.: 524,412

[22] Filed: Sep. 6, 1995

[30] Foreign Application Priority Data

Sep. 8, 1994 [JP] Japan ................... 6-214929

[51] Int. Cl.$^6$ ........................................... G11B 7/00
[52] U.S. Cl. ........................................... 369/32
[58] Field of Search .................. 369/44.27, 44.28, 369/44.29, 32, 124, 47

[56] References Cited

U.S. PATENT DOCUMENTS

| | | | |
|---|---|---|---|
| 5,355,353 | 10/1994 | Kaiho | 369/32 |
| 5,359,580 | 10/1994 | Miura et al. | 369/47 |
| 5,428,590 | 6/1995 | Ogino | 369/32 |
| 5,500,840 | 3/1996 | Ogasawara | 369/32 |
| 5,515,349 | 5/1996 | Yamazaki et al. | 369/32 |

*Primary Examiner*—Nabil Hindi
*Attorney, Agent, or Firm*—Fitzpatrick, Cella, Harper & Scinto

[57] ABSTRACT

An information recording/reproducing apparatus includes a single arithmetic device for executing, in parallel, system processing for processing a command from a host computer and servo control processing for positioning a recording/reproducing head on a target track. The arithmetic device executes preparation processing for a recording and/or reproducing operation to be executed after a seek operation, during the seek operation of the head to the target track. The preparation processing includes a setting operation of a frequency of a synchronous signal used for recording and/or reproducing information, modulation processing of recording data, or the like.

3 Claims, 6 Drawing Sheets

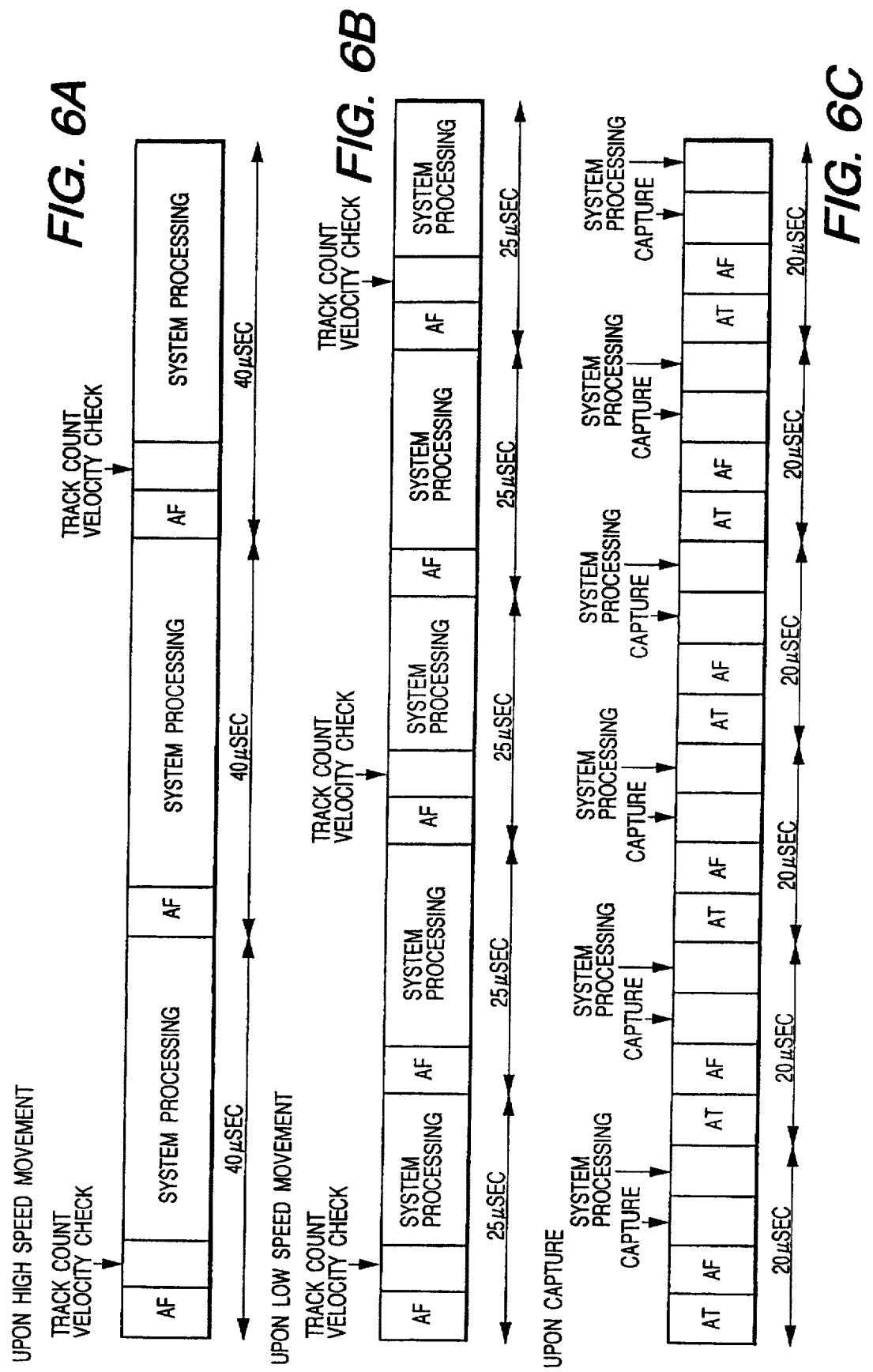

INFORMATION RECORDING/ REPRODUCING APPARATUS FOR EXECUTING SYSTEM CONTROL AND SERVO CONTROL BY SINGLE CPU

BACKGROUND OF THE INVENTION

1. Field of the Invention

The present invention relates to an information recording/ reproducing apparatus for recording and/or reproducing information in accordance with a command from a host apparatus such as a host computer.

2. Related Background Art

In recent years, much progress has been made in the development of information recording/reproducing apparatuses. An example of a magneto-optical disc drive apparatus for optically recording and/or reproducing information from a host computer will be described below with reference to FIG. 1.

Referring to FIG. 1, a host computer 1 controls data transmission/reception for transmitting control command such as a track jump command, recording command, reproduction command, and the like to the magneto-optical disc drive apparatus, and receiving a reproduced signal. An SPC (SCSI Protocol Control) 2 comprises an SCSI interface circuit as a kind of interface between the host computer 1 and the storage apparatus. With this interface circuit, a read/write command from the host computer 1, and a response to this command are executed.

When the host computer 1 supplies, e.g., a data recording command to the SPC 2 as the input section of the magneto-optical disc drive apparatus, a drive CPU 30 executes a calculation for converting a logic address corresponding to a recording area from the host computer 1 into a physical address corresponding to the actual recording area of an optical disc.

When an optical disc to be subjected to recording/ reproducing is a ZCAV disc which has different recording densities in units of several zones in correspondence with the distances in the radial direction, the drive CPU 30 sets zone data corresponding to the physical address in a binarizing PLL circuit 12.

Thereafter, the drive CPU 30 supplies recording data to a modulation/demodulation circuit 10, records the information data in a buffer RAM 11 in the recording data format on the optical disc, and calculates the number of tracks to jump on the basis of the difference between the target physical address and the physical address corresponding to the current position of a laser beam spot from a semiconductor laser.

The drive CPU 30 supplies a jump command corresponding to the number of tracks to jump in the inner or outer peripheral direction to a servo CPU 31 on the basis of data of the calculated number of tracks.

The drive CPU 30 performs the above processing and calculation using microcodes and calculation data stored in a ROM I 5 and a RAM I 6.

The RAM I 6 is also used as a cache buffer. That is, when a read command for reading data at a logic address read once by the host computer 1 is supplied again from the host computer 1, the RAM I 6 transmits the data stored upon initial access to the host computer 1 without executing the second and subsequent disc accesses.

The servo CPU 31 is a control circuit for normally positioning the beam spot irradiated onto the optical disc to the target track. A ROM II 8 and a RAM II 7 serve as buffer memories for storing microcodes and calculation data used by the servo CPU 31.

A clock generator 9 is an oscillation circuit for generating clocks of a predetermined period for periodically activating the servo CPU 31.

Upon reception of a jump command indicating a moving direction and the number of tracks on the optical disc, the servo CPU 31 sets the data in a D/A converter 17 so that the beam spot can reach the target track.

A tracking driver 19, a focusing driver 20, and a linear motor driver 21 respectively amplify set voltages to respectively supply currents to a tracking coil 25, a focusing coil 24, and a linear motor coil 23, thereby moving the beam spot to the target address.

After the beam spot is moved by the indicated number of tracks, the servo CPU 31 supplies information indicating the end of movement to the drive CPU 30.

Upon reception of the movement end information, the drive CPU 30 supplies a write command to the servo CPU 31 to set a write state on the optical disc, and controls the modulation/demodulation circuit 10 to perform a recording operation.

Upon reception of the write command, the servo CPU 31 sets write power data in the D/A converter 17 to supply a write power voltage to a laser driver 18.

Similarly, upon reception of the write command, the modulation/demodulation circuit 10 reads out stored data from the buffer RAM 11, and transmits the data to be written to the laser driver 18.

The laser driver 18 synthesizes and amplifies the voltage from the D/A converter 17 and the data from the modulation/ demodulation circuit 10, and turns on a semiconductor laser 26 in accordance with the synthesized signal, thereby recording data according to the synthesized signal on the optical disc.

However, in recent years, high-speed processing and a low-cost arrangement are required for the information recording/reproducing apparatus. In particular, in the conventional arrangement, since two CPUs, i.e., the drive CPU and the servo CPU, are arranged, they make the apparatus expensive.

In the conventional arrangement, although the drive CPU and the servo CPU are connected via a bus, they require long communication times therebetween. For this reason, it is impossible for the drive CPU to immediately detect the state of the servo CPU, and it is impossible to quickly execute a series of operations associated with recording or reproduction.

SUMMARY OF THE INVENTION

The present invention has been made in consideration of the above-mentioned problems, and has as its object to provide an inexpensive information recording/reproducing apparatus which can stably execute, at high speed, processing other than servo control processing executed during a seek operation of a beam spot (optical head) to a target track.

In order to achieve the above object, there is provided an information recording/reproducing apparatus comprising single arithmetic means for executing, in parallel, system processing for processing a command from a host computer and servo control processing for positioning a recording/ reproducing head on a target track, wherein the arithmetic means executes preparation processing for a recording or reproduction operation to be executed after a seek operation during the seek operation of the head to the target track, There is also provided an information recording/ reproducing apparatus comprising single arithmetic means for executing, in parallel, system processing for processing a command from a host computer and servo control processing for positioning a recording/reproducing head on a target track, wherein the arithmetic means executes an address calculation of the target track during a seek operation of the head to the target track.

There is also provided an information recording/ reproducing method for executing, in parallel, system processing for processing a command from a host computer and servo control processing for positioning a recording/ reproducing head on a target track using single arithmetic means, comprising the steps of:

performing a seek operation of the head to the target track; and causing the system processing to execute preparation processing for a recording or reproduction operation, to be executed after the seek operation, during the seek operation.

There is also provided an information recording/ reproducing method for executing, in parallel, system processing for processing a command from a host computer and servo control processing for positioning a recording/ reproducing head on a target track using single arithmetic means, comprising the steps of:

performing a seek operation of the head to the target track; and causing the system processing to execute an address calculation of the target track during the seek operation.

The above and other objects and features of the present invention will become apparent from the following description of the embodiments taken in conjunction with the accompanying drawings.

BRIEF DESCRIPTION OF THE DRAWINGS

FIGS. 6A through 6C are charts for explaining program action according to the embodiment of the invention.

DETAILED DESCRIPTION OF THE PREFERRED EMBODIMENTS

[First Embodiment]

Figure 1:
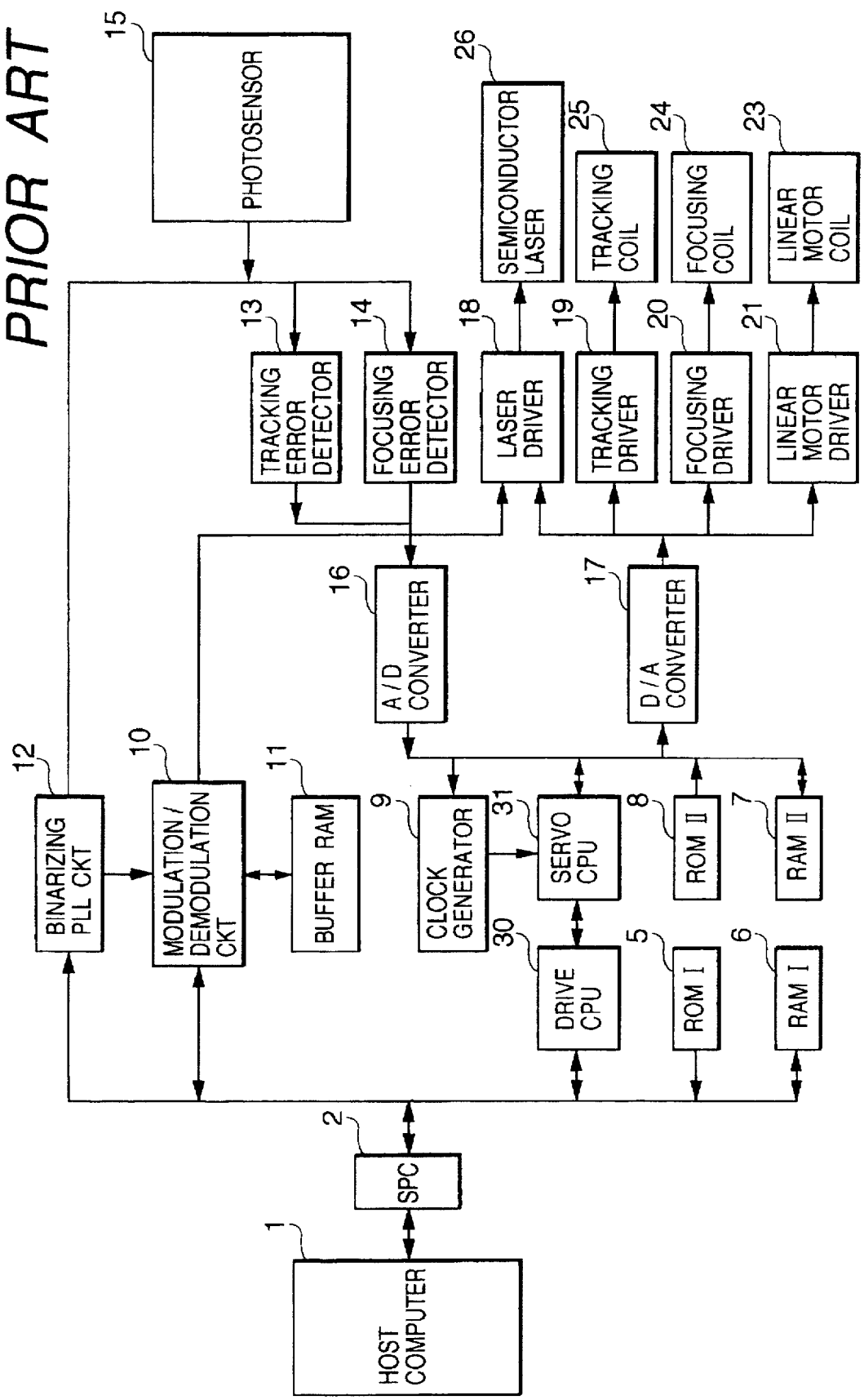
FIG. 1 is a block diagram showing the arrangement of a conventional apparatus.
Figure 2:
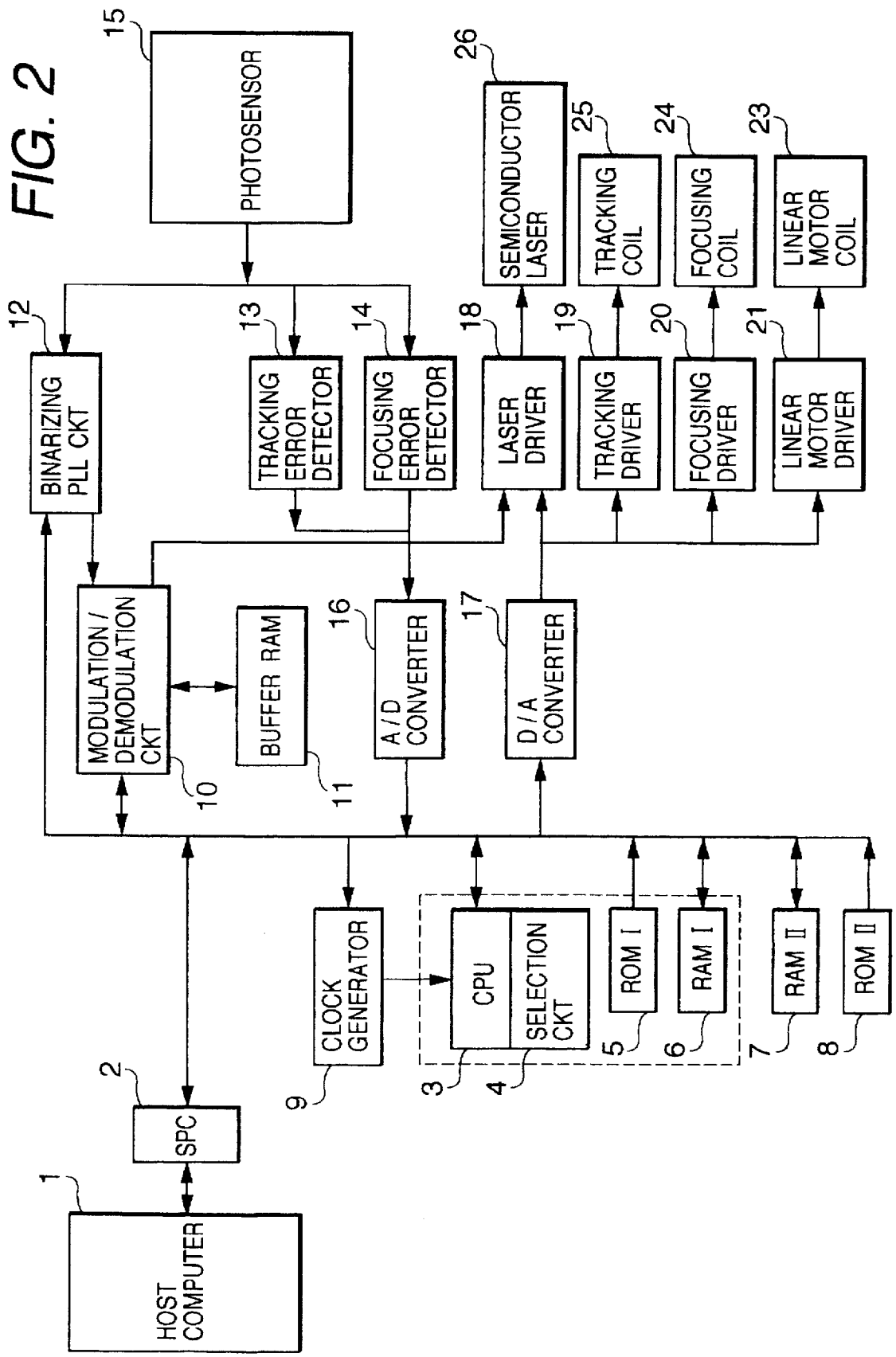
FIG. 2 is a block diagram showing the arrangement according to the first embodiment of the present invention.

The first embodiment of the present invention will be described in detail below with reference to the accompanying drawings. FIG. 2 is a block diagram of an information recording/reproducing apparatus according to the present invention, and the same reference numerals in FIG. 2 denote parts having the same functions as in FIG. 1, to simplify the following description.

Referring to FIG. 2, a host computer 1 and an optical disc drive apparatus are connected via an SCSI interface.

An SPC 2 is an SCSI interface circuit for receiving a read/write command from the host computer 1 and transmitting a response thereto. A CPU 3 controls the entire optical disc drive apparatus. A selection circuit 4 time-divisionally selects system control for processing a command from the host computer, and servo processing for controlling a recording/reproducing head to be located at the target track. Note that the selection circuit 4 may be arranged in the CPU 3. The CPU 3 performs transfer of information data to be recorded/reproduced, and arithmetic processing of, e.g., the number of tracks to jump, and the like.

A ROM I 5 and a RAM I 6 store microcodes and arithmetic data used in the servo processing for positioning a beam spot on the target track.

A RAM II 7 and a ROM II 8 store microcodes and processing data used for system control such as data transfer between the host computer 1 and a modulation/ demodulation circuit 10.

Since the CPU 3, the selection circuit 4, the ROM I 5, and the RAM I 6 are formed on a single semiconductor chip, the communication transmission times among these components can be minimized, and are shorter than those between the RAM II 7 and the ROM II 8, and the CPU 3.

As a system control program, for example, an ITRON OS is installed, and the program is executed for a relatively long period of time. Upon completion of the system control program, an idle task state that executes nothing is set. When the selection circuit selects the servo processing, the system control program is interrupted and the servo processing is executed.

A clock generator 9 comprises, e.g., oscillators having frequencies of 50, 40, and 25 kHz, and determines the clock frequency in accordance with a control signal from the CPU 3. The oscillation signal from the clock generator 9 is a pulse wave, and periodically interrupts the CPU 3 at its trailing edge timing. Upon interruption, the selection circuit 4 switches the CPU 3 to start a servo program stored in the ROM I 5, and the CPU 3 executes digital servo arithmetic processing for positioning a beam spot on the target track.

Upon completion of the servo arithmetic processing, the selection circuit 4 selects to execute the system control in the ROM II 8 by the CPU 3, and the CPU 3 returns to the system control program.

For this reason, when the time of the servo processing program is long, the execution time of a series of system control program tasks is prolonged; when the time of the servo processing program is short, the system control program ends in a short period of time.

The modulation/demodulation circuit 10 is a circuit for converting data from the host computer 1 into data in the optical disc format or converting data in the optical disc format into data in the host computer format. The modulation/demodulation circuit 10 also comprises a code error correction circuit. Thus, upon conversion of data in the optical disc format required for reproduction into data in the host computer format, if a data error is detected, the modulation/demodulation circuit 10 executes an operation for restoring the data to normal data.

A buffer RAM 11 temporarily stores data to be stored or reproduced data via the modulation/demodulation circuit 10. The buffer RAM 11 is also used for simultaneously transferring data.

A binarizing PLL circuit 12 is a circuit for converting a reproduced analog signal, which is obtained by photoelectrically converting light reflected by the optical disc by a photosensor 15, into a digital signal.

Upon execution of data conversion for converting a reproduced analog signal into a digital signal, a timing synchronization clock is set in accordance with a control signal from the CPU 3. Since the optical disc to be subjected to recording or reproduction has the ZCAV format which has different data recording densities in units of several zones in correspondence with the radial distances, the CPU 3 sets a control signal of a PLL circuit in the binarizing PLL circuit on the basis of a specific clock signal from the clock generator 9 so as to obtain a synchronization clock by setting the same frequency as the recording frequency in correspondence with a zone at the address to be reproduced, thereby obtaining digital data of a reproduced signal.

A tracking error detector 13 and a focusing error detector 14 are circuits for converting a signal from the photosensor 15 into a signal (AT signal) indicating the error, in the radial direction, between the beam spot and the target track on the optical disc, and a signal (AF signal) indicating the focusing error of the beam spot in the vertical direction on the optical disc surface. These two signals are converted into digital signals by an A/D converter 16. The digital signals are supplied to the CPU 3, and are stored in the RAM I 6.

A D/A converter 17 is a circuit for converting laser power, and focusing, tracking, and linear motor drive digital signals calculated by the CPU 3 into analog signals.

A laser driver 18 generates a signal obtained by synthesizing data to be recorded on the disc output from the modulation/demodulation circuit 10 and an appropriate write power voltage from the D/A converter 17, and amplifies the synthesized signal in the data recording mode. The output from the laser driver 18 turns on a semiconductor laser 26 to record a recording pit on the optical disc.

On the other hand, when data is read from the optical disc, a digital signal corresponding to an optimal light-emitting amount of the semiconductor laser 26 is output from the CPU 3, and is converted by the D/A converter 17 into an analog signal. The analog signal is amplified by the laser driver 18 to an appropriate read power voltage level, thus turning on the semiconductor laser 26 at the read power. A laser beam corresponding to the read power is irradiated onto the optical disc, and light reflected by the disc is incident on the photosensor 15. A read signal obtained by photoelectrically converting the incident light is supplied to the host computer 1 via the binarizing PLL circuit 12, the modulation/demodulation circuit 10, and the SPC 2. In this case, the buffer RAM 11 temporarily stores the read signal as cache processing.

As the servo processing upon reading/writing of data on/from the optical disc, the outputs from a tracking driver 19, a focusing driver 20, and a linear motor driver 21 respectively drive a tracking coil 25, a focusing coil 24, and a linear motor coil 23 to drive a mechatronics unit associated with the servo processing by three-dimensionally moving the optical system for irradiating the beam spot. With this processing, the laser beam spot is controlled to reach the target track.

Figure 3:
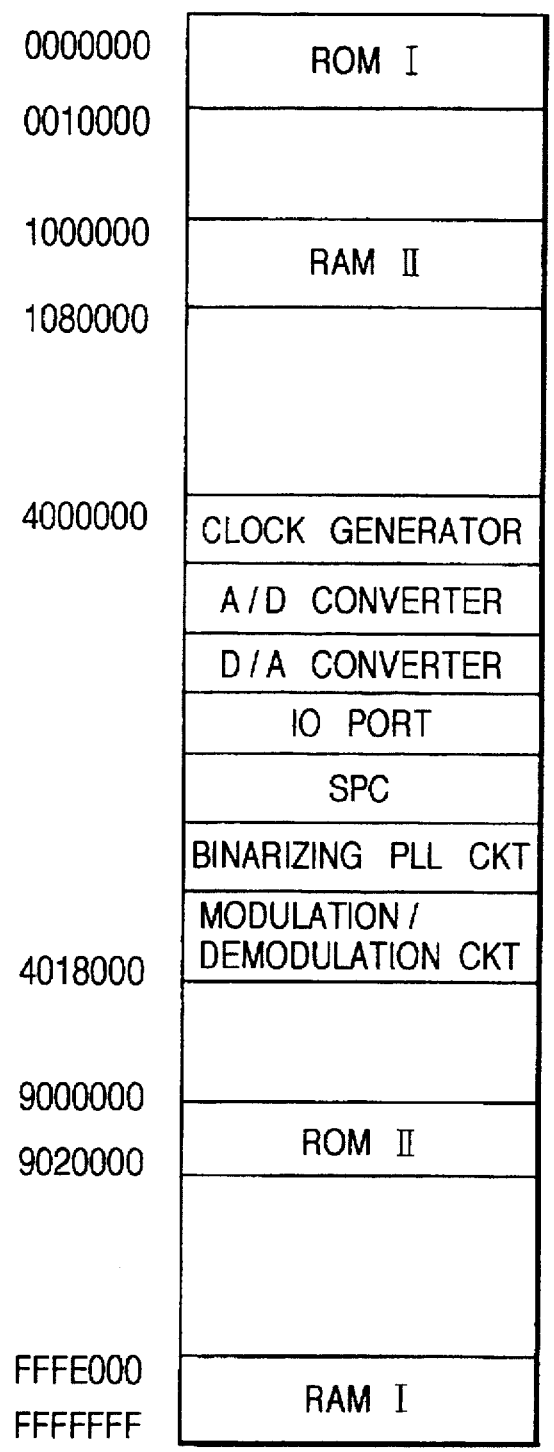
FIG. 3 is a map for explaining the memory map according to the first embodiment of the present invention.

FIG. 3 shows an example of the address map of the system which can be accessed by the CPU 3.

The area of the ROM I 5 is allocated from address "0000000" to address "000FFFF", the area of the RAM II 7 is allocated from address "1000000" to address "107FFFF", and the clock generator 9, the A/D converter 16, the D/A converter 17, the I/O port (not shown) of the CPU 3, the SPC 2, the binarizing PLL circuit 12, and the modulation/demodulation circuit 10 are respectively allocated from address "4000000" to address "4017FFF".

The area of the ROM II 8 is allocated from address "9000000" to address "901FFFF", and the area of the RAM I 6 is allocated from address "FFFE000" to address "FFFFFFF".

The CPU 3 time-divisionally selects the system control such as read control, write control, and the like, and the servo control such as tracking control, focusing control, and the like using the selection circuit 4, and executes the above-mentioned processing and arithmetic operations using various data at the addresses on the basis of these addresses as indices.

A case will be described below wherein the host computer 1 issues a data write command. The CPU 3 interprets this command, and calculates the physical address as the actual track address of the optical disc on the basis of the logic track address from the host computer 1 in accordance with a predetermined table so as to bring a beam spot to the track to be recorded on the disc.

Since this address calculation is time-consuming due to a large calculation amount, the CPU 3 performs a rough address calculation, which is simplified to some extent, within a short period of time, and stores the calculated data in the RAM II 7. Then, the CPU 3 calculates the number of tracks across which a beam spot is to be moved on the basis of the roughly calculated address value, and disables the loop in the servo loop state to cancel the servo state. The CPU 3 switches the control state to the seek state.

In this case, when the number of tracks to seek is large, and a long seek time is expected to be required, the CPU 3 sets the clock generator 9 at 25 kHz, and executes the following operations.

The system control processing using the ROM II 8 and the RAM II 7 is executed at a stance of a relatively long period of time under, e.g., the ITRON OS, and the servo processing using the ROM I 5 and the RAM I 6 is inserted in the system control processing at predetermined intervals of 25 kHz (40 μsec), thus executing a series of operations.

In order to move the linear motor for moving an optical system head unit in the radial direction of the disc at high speed, the CPU 3 sets data for the linear motor coil 23 in the D/A converter 17, thus moving the beam spot at high speed upon movement of the optical system by the linear motor.

At the beginning of the movement, the beam spot does not move at high speed due to the influence of mechanical inertia, or the like. However, the CPU 3 executes the same control processing as that executed upon high-speed movement.

Upon high-speed movement of the beam spot, the servo processing executes focusing filter arithmetic processing at 40-μsec intervals, and executes track count processing and velocity checking processing once per two servo interrupts (80 μsec).

When the beam spot gradually approaches the target track, a deceleration operation is executed, and a low track moving velocity is set.

In the low-velocity state, the CPU 3 sets the clock generator 9 at 40 kHz to execute the focusing filter arithmetic processing at 25-μsec intervals and to execute the track count processing and velocity checking processing once per two servo interrupts (50 μsec).

Upon capturing on the target track, tracking and focusing servo loops are formed. In this state, the CPU 3 sets the clock generator 9 at 50 kHz (20 μsec) to execute the tracking filter arithmetic processing, focusing filter arithmetic processing, and capture arithmetic processing at 20-μsec intervals, thus executing tracking servo processing and focusing servo processing.

During execution of the servo processing, i.e., the seek operation, the system control processing using the ROM II 8 and the RAM II 7 by the CPU 3 prepares for setting the frequency of the binarizing PLL circuit 12 in correspondence with the zone of the disc after the seek operation on the basis of the address calculation value roughly calculated before the seek operation, and sequentially stores recording data to be output to the semiconductor laser 26 after the seek operation in the buffer RAM 11 via the modulation/demodulation circuit 10.

After the recording data is stored in the buffer RAM 11, the CPU 3 calculates an accurate address, and stores the calculated data in the RAM II 7.

The system control processing is executed at high speed during the high-speed movement of the seek operation with a light servo processing load. During the low-speed movement or capturing with a heavy servo processing load, the system processing load can be reduced.

The servo processing during the low-speed movement of the seek operation or capturing reads out the accurate number of tracks to lump calculated during the high-speed movement from the RAM II 7, and accurately moves the beam spot to the target track at high speed.

FIGS. 6A through 6C show the program flows upon high-speed movement, low-speed movement, and capturing.

Upon high-speed movement, the servo processing executes the AF filter calculation at 40-μsec intervals and the track count processing and velocity check processing at 80-μsec intervals. In the remaining time, the system control processing program executes the frequency setting operation of the binarizing PLL circuit 12, the setting operation of recording data to be recorded after the seek operation in the buffer RAM 11 via the modulation/demodulation circuit 10, and the accurate address calculation.

Upon low-speed movement, the servo processing executes the AF filter calculation at 25-μsec intervals and the track count processing and velocity check processing at 50-μsec intervals. In the remaining time, the system control processing program executes its operations.

Upon capturing, the servo processing executes the AT filter calculation, AF filter calculation, and capturing processing at 20-μsec intervals, and the system control processing program is executed in the remaining time.

However, upon low-speed movement and capturing, the system control processing time is relatively prolonged since the allowed processing time is shorter than that upon high-speed movement. However, upon low-speed movement and capturing, the idle task state is set most of the time due to small system control processing amounts, and no serious problem is posed.

In this embodiment, data write processing has been mainly exemplified. However, when data is read out from the optical disc, the servo processing and the system control processing are substantially the same as those described above, except for differences in the read power level to the semiconductor laser 26, the input portion of the binarizing PLL circuit 12, and the data stored in the buffer RAM 11. For this reason, the effect of the above-mentioned operation can also be expected.

In this embodiment, the system control means for setting, e.g., the synchronization frequency is executed during, especially, the seek operation. However, the system control means need not always be executed during the seek operation. For example, during the series of operations in the servo control, some operations of the system control means such as the setting operation of the synchronization frequency, the storing operation of recording data in the buffer RAM 11, and the like may be executed upon selection by the selection circuit 4 from the CPU 3, as a matter of course.

[Second Embodiment]

Figure 4:
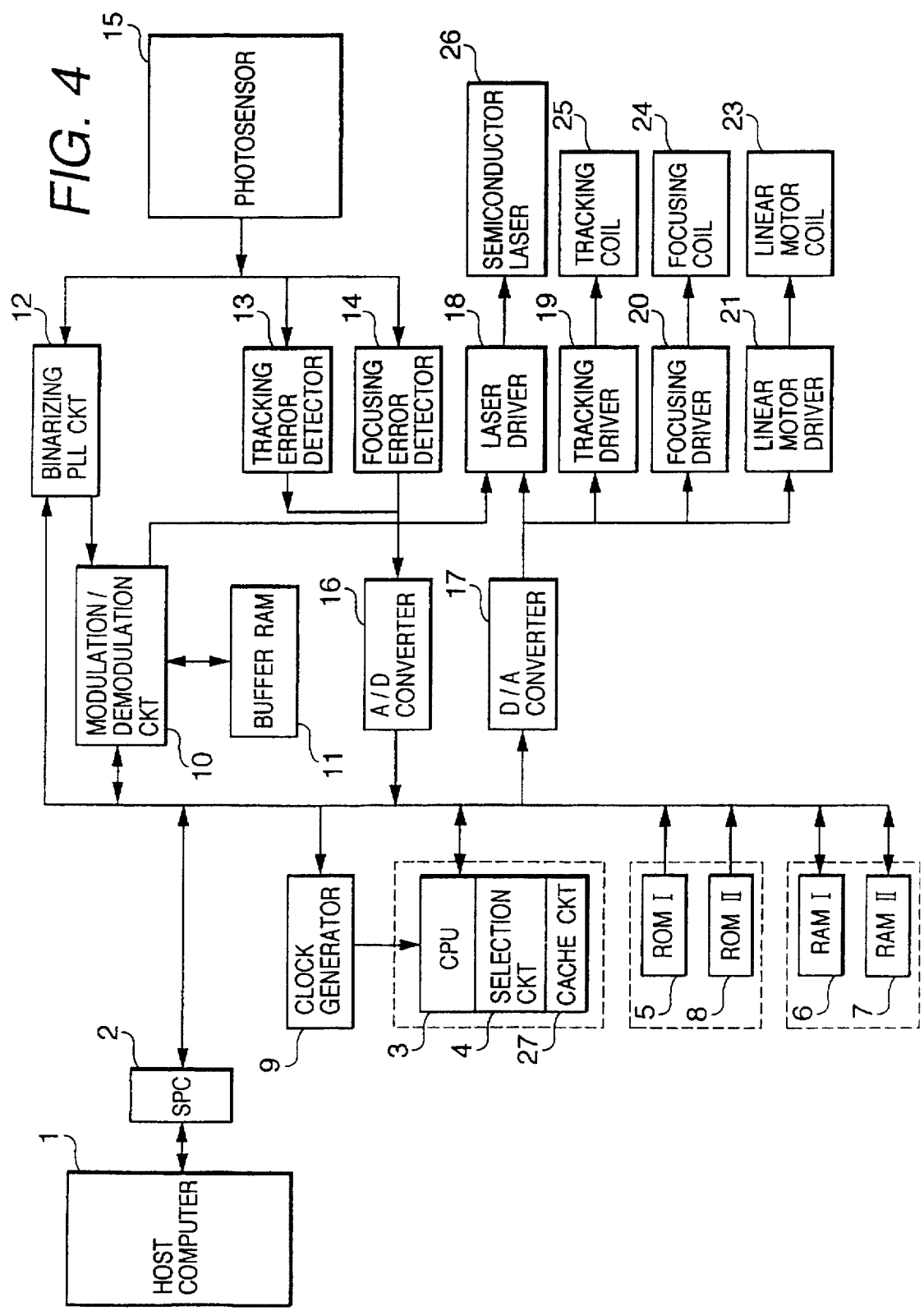
FIG. 4 is a block diagram showing the arrangement according to the second embodiment of the present invention.

FIG. 4 is a block diagram of an information recording/reproducing apparatus according to the second embodiment of the present invention. The second embodiment will be described in detail below with reference to FIG. 4. Note that the same reference numerals in FIG. 4 denote parts having substantially the same functions as in FIG. 2, and a detailed description thereof will be omitted.

Referring to FIG. 4, a host computer 1 and an optical disc drive apparatus are connected via an SCSI interface.

An SPC 2 is an SCSI interface circuit for receiving a read/write command from the host computer 1 and transmitting a response thereto.

A CPU 3 controls the entire optical disc drive apparatus, time-divisionally selects system control and servo processing via a selection circuit 4, and executes transfer and calculations of selected data.

A ROM I 5 and a RAM I 6 store microcodes and arithmetic data used in the servo processing for positioning a beam spot on the target track.

A RAM II 7 and a ROM II 8 store microcodes and processing data used for system control such as data transfer between the host computer and a modulation/demodulation circuit 10.

The RAM II 7 is also used as a cache buffer, and has a large storage capacity.

A cache circuit 27 simultaneously stores data in the ROMs and RAMs. When data in the read address range are accessed again, if data in a predetermined range are to be continuously used using the data read in advance, in place of utilizing external data other than data in the CPU 3, the data stored in the cache circuit 27 are immediately read out, thus allowing a high-speed operation.

Note that the CPU 3, the selection circuit 4, and the cache circuit 27 are formed on a single semiconductor chip, and the ROM I 5, the RAM I 6, the ROM II 8, and the RAM II 7 are formed on a single semiconductor chip, thus assuring high-speed processing by shortening their connection lines.

As a system control program, for example, an ITRON OS is installed, and the program is executed for a relatively long period of time. Upon completion of the system control program, an idle task state that executes nothing is set, and the control waits until the next system program is started.

A clock generator 9 comprises, e.g., oscillators having frequencies of 50 40, and 25 kHz, and determines the clock frequency in accordance with a control signal from the CPU 3.

The CPU 3 is periodically interrupted in response to the trailing edge timing of the oscillation signal from the clock generator 9. In response to the interrupt signal, the selection circuit 4 selects the servo processing, and the CPU 3 starts a servo processing program stored in the ROM I 5 to execute digital servo arithmetic processing for positioning a beam spot on the target track. For example, the digital servo arithmetic processing includes a tracking filter arithmetic operation, a focusing filter arithmetic operation, a capturing processing arithmetic operation, and the like. Upon completion of these arithmetic operations, the selection circuit 4 selects the system control program in the ROM II 8, and the control returns to the system control processing program.

For this reason, when the time of the servo processing program is long, the execution time of a series of system control program tasks is prolonged; when the time of the servo processing program is short, the system control program ends in a short period of time.

The modulation/demodulation circuit 10 is a circuit for converting data from the host computer 1 into data in the optical disc format or converting data in the optical disc format into data in the host computer format. Upon conversion of data in the optical disc format required for reproduction into data in the host computer format, if a data error is detected, the modulation/demodulation circuit 10 also executes an operation for restoring the data to normal data.

A buffer RAM 11 temporarily stores data to be stored or reproduced data via the modulation/demodulation circuit 10. The buffer RAM 11 is also used for simultaneously transferring data.

A binarizing PLL circuit 12 is a circuit for converting an analog signal, which is obtained when light reflected by the optical disc and received by a photosensor 15 is converted into an electrical signal, into a digital signal. The binarizing PLL circuit 12 incorporates a PLL circuit for setting a predetermined frequency to attain a predetermined synchronization timing upon digital conversion. Upon data conversion into a digital signal, the frequency of the synchronization clock is set by the CPU 3 in correspondence with the track zone.

Since the disc to be subjected to recording or reproduction has the ZCAV format which has different data recording densities in units of several zones in correspondence with the radial distances, the CPU 3 sets the synchronization clock in correspondence with the zone of the track address to be subjected to recording or reproduction.

A tracking error detector 13 and a focusing error detector 14 are circuits for converting a signal from the photosensor 15 into a signal (AT signal) indicating the error, in the radial direction, between the beam spot and the target track on the optical disc, and a signal (AF signal) indicating the focusing error between the beam spot and the optical disc surface. These two signals are converted into digital signals by an A/D converter 16. The digital signals are supplied to the CPU 3, and are used as the level data of error amounts in arithmetic operations in the tracking servo processing and the focusing servo processing.

A D/A converter 17 is a circuit for converting laser power, and focusing, tracking, and linear motor drive digital signals calculated by the CPU 3 into analog signals.

A laser driver 18 generates a signal obtained by synthesizing data to be recorded on the optical disc output from the modulation/demodulation circuit 10 and a write power voltage from the D/A converter 17, and amplifies the synthesized signal in the data recording mode. The amplified synthesized signal turns on a semiconductor laser 26 to record a recording pit on the optical disc.

On the other hand, in the data reading mode, a digital signal output from the CPU 3 is converted by the D/A converter 17 into an analog signal. The analog signal is amplified as a read power voltage by the laser driver 18, thus turning on the semiconductor laser 26 at the read power. A laser beam corresponding to the read power is irradiated from the semiconductor laser 26 onto the optical disc via an optical system to scan the recording pits. A read signal obtained by detecting reflected light by the photosensor 15 is converted into a digital signal by the binarizing PLL circuit 12, and is supplied to the host computer 1 via the modulation/demodulation circuit 10.

Drive digital signals output from the CPU 3 respectively become the outputs from a tracking driver 19, a focusing driver 20, and a linear motor driver 21 via the D/A converter 17, and drive a tracking coil 25, a focusing coil 24, and a linear motor coil 23 so as to drive a mechatronics unit associated with the beam spot by three-dimensionally moving the optical system for irradiating the beam spot. With this processing, the laser beam spot is controlled to reach the target track.

Figure 5:
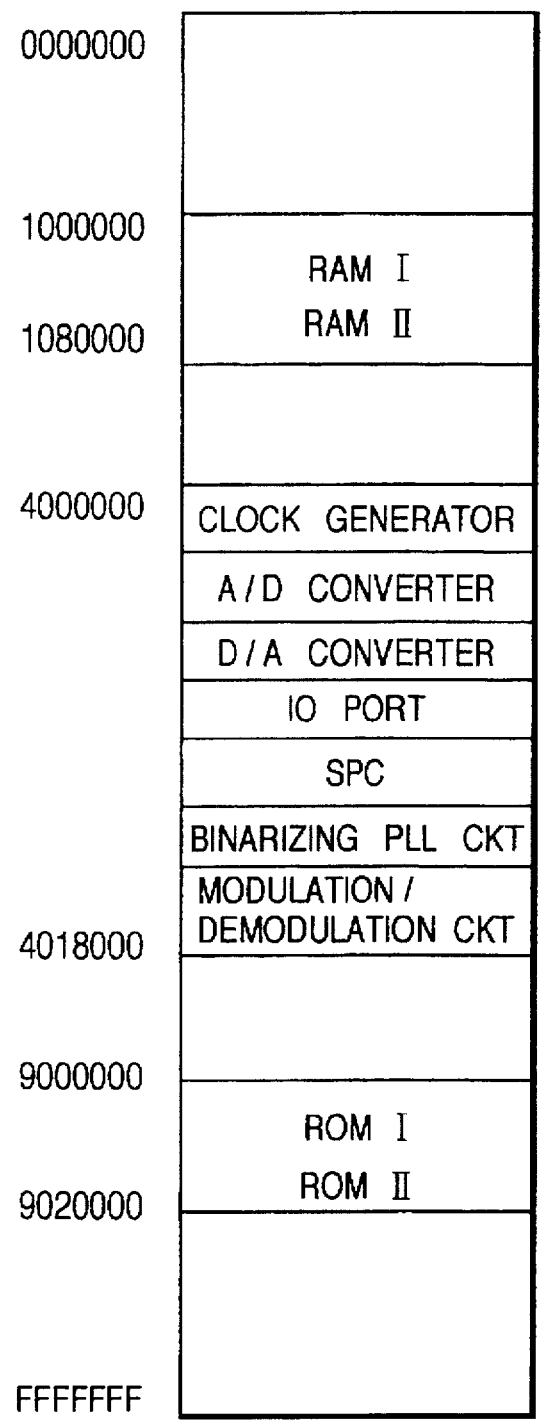
FIG. 5 is a map for explaining the memory map according to the second embodiment of the present invention.

FIG. 5 shows an example of the address map of the system which can be accessed by the CPU 3.

The area of the RAM I 6 and the RAM II 7 is allocated from address "1000000" to address "107FFFF", and the clock generator 9, the A/D converter 16, the D/A converter 17, the I/O port (not shown) of the CPU 3, the SPC 2, the binarizing PLL circuit 12, and the modulation/demodulation circuit 10 are respectively allocated from address "4000000" to address "4017FFF".

The area of the ROM I 5 and the ROM II 8 is allocated from address "9000000" to address "901FFFF".

The CPU 3 time-divisionally selects the system control processing and the servo control processing via the selection circuit 4, and executes the processing and arithmetic operations in accordance with various data at the addresses in the ROMs, RAMs, and the like corresponding to the selected processing.

Normally, when the host computer 1 issues a data write command, the CPU 3 interprets this command, temporarily stores data to be recorded in the RAM II 7, and sends a response message indicating the end of recording to the host computer 1.

Then, the host computer 1 interprets this response message as if data to be recorded were recorded in the optical disc, and can execute the next operation without waiting for the end of actual recording on the disc.

On the other hand, the CPU 3 changes the servo state to the seek state to move the beam spot to the target track, and sets the clock generator 9 at 25 kHz.

The system control processing using the ROM II 8 and the RAM II 7 is executed at a stance of a relatively long period of time under, e.g., the ITRON OS, and the servo processing using the ROM I 5 and the RAM I 6 is inserted in the system control processing at predetermined intervals of 25 kHz (40 μsec), thus executing a series of operations.

In order to move the linear motor at high speed, data for moving the motor at high speed is set in the D/A converter 17, thereby accelerating the beam spot.

Upon acceleration movement of the beam spot, the servo processing executes the focusing filter arithmetic processing at 40-μsec intervals, and executes track count processing and velocity check processing once per two servo interrupts (80 μsec).

When the beam spot gradually approaches the target track and a deceleration operation is executed, the clock generator 9 is set at 40 kHz to execute the focusing filter arithmetic processing at 25-μsec intervals and to execute the track count processing and velocity check processing once per two servo interrupts (50 μsec).

Upon capturing on the target track, the clock generator is set at 50 kHz to execute the track filtering arithmetic processing, focusing filter arithmetic processing, and capturing processing at 20-μsec intervals.

During execution of the servo processing, when the host computer 1 issues a command for reading data in an area stored in the RAM II 7, the system control processing using the RAM II 7 and the ROM II 8 reads out data in the RAM II 7 and transfers the readout data to the host computer 1 during the acceleration time of the servo processing.

On the other hand, when the host computer 1 issues a command for recording new data, the CPU 3 writes this data in the RAM II 7 with a cache function, and supplies a message indicating the end of recording on the optical disc corresponding to the new data recording command to the host computer 1.

The programs of the servo processing and the system control processing at that time upon acceleration movement are the same as those upon high-speed movement shown in FIGS. 6A through 6C, the programs upon deceleration movement are the same as those upon low-speed movement shown in FIGS. 6A through 6C, and the programs upon capturing are the same as those upon capturing shown in FIGS. 6A through 6C.

For example, upon acceleration movement, the servo processing executes the AF filter calculation at 40-µsec intervals and executes the track count processing and velocity check processing at 80-µsec intervals, and the cache processing program for, e.g., transferring data to the host computer 1 is executed in the remaining time.

Upon deceleration movement, the servo processing executes the AF filter calculation at 25-µsec intervals and executes the track count processing and velocity check processing at 50-µsec intervals, and the system control processing operates in the remaining time.

Furthermore, upon capturing, the servo processing executes the AT filter calculation, AF filter calculation, and capturing processing at 20-µsec intervals, and the system control processing operates in the remaining time.

However, upon deceleration movement and capturing, the system control processing time has a smaller time margin than that upon acceleration movement, and is relatively prolonged. However, in practice, the idle task state is set most of the time due to small system control processing amounts, and no serious problem is posed.

As described above, the CPU 3 temporarily stores data A to be recorded in the RAM II 7 in correspondence with a command from the host computer 1. When the host computer 1 requests to output the same data again, the CPU 3 reads out the data from the RAM II 7 and transfers the readout data. Thereafter, when the host computer 1 issues a write command, the CPU 3 stores data B to be recorded in the RAM II 7. When the first data A is stored as recording bits on the optical disc, the CPU 3 starts a seek operation, and records the data B to be recorded at a calculated predetermined physical address as recording pits. In this manner, the CPU 3 executes a so-called cache operation.

Therefore, since the host computer 1 issues commands one by one and receives corresponding data one by one, it need not monitor the magneto-optical disc apparatus all the time, and can have a margin for processing another program.

Similarly, since the CPU 3 has three stages of processing means such as processing upon high-speed movement during, especially, the seek operation to execute the system control processing together with a cache operation that can reduce any idle time, the operation of the CPU 3 can be programmed at high density, thus shortening the processing time and realizing high-efficiency processing.

What is claimed is:

1. An information recording/reproducing apparatus comprising:

single arithmetic means for executing, in parallel, system processing for processing a command from a host computer and servo control processing for positioning a recording/reproducing head on a target track by interrupting the servo control processing into the system processing, wherein said arithmetic means causes an interrupt frequency of the servo control processing to be made higher as the head nears the target track and sets a frequency of a synchronizing signal for recording and/ or reproducing information when the interrupt frequency is low.

2. An information recording/reproducing apparatus comprising:

single arithmetic means for executing, in parallel, system processing for processing a command from a host computer and servo control processing for positioning a recording/reproducing head on a target track by interrupting the servo control processing into the system processing; and a memory for storing recording and/or reproducing data, wherein said arithmetic means causes an interrupt frequency of the servo control processing to be made higher as the head nears the target track and effects data transfer processing between the host computer and the memory when the interrupt frequency is low.

3. An information recording/reproducing apparatus comprising:

single arithmetic means for executing, in parallel, system processing for processing a command from a host computer and servo control processing for positioning a recording/reproducing head on a target track by interrupting the servo control processing into the system processing, wherein said arithmetic means causes an interrupt frequency of the servo control processing to be made higher as the head nears the target track and effects address calculation for the target track when the interrupt frequency is low.

* * * * *

UNITED STATES PATENT AND TRADEMARK OFFICE
CERTIFICATE OF CORRECTION

PATENT NO. : 5,703,842
DATED : December 30, 1997
INVENTOR(S) : NOBUYUKI TONEGAWA It is certified that error appears in the above-indentified patent and that said Letters Patent is hereby corrected as shown below:

COLUMN 1:

Line 21, "command" should read --commands--;
and
      Line 22, "recording command, repro-" should read --a recording command, a repro- --.

COLUMN 6:

Line 64, the right margin should be closed up;
and
      Line 65, the left margin should be closed up.

Signed and Sealed this

Thirtieth Day of June, 1998

Attest:

BRUCE LEHMAN

*Attesting Officer*  *Commissioner of Patents and Trademarks*